July 21, 1942.　　　A. A. STEINMILLER　　　2,290,589
ROTARY INERTIA DEVICE
Filed Jan. 31, 1941　　　2 Sheets-Sheet 1
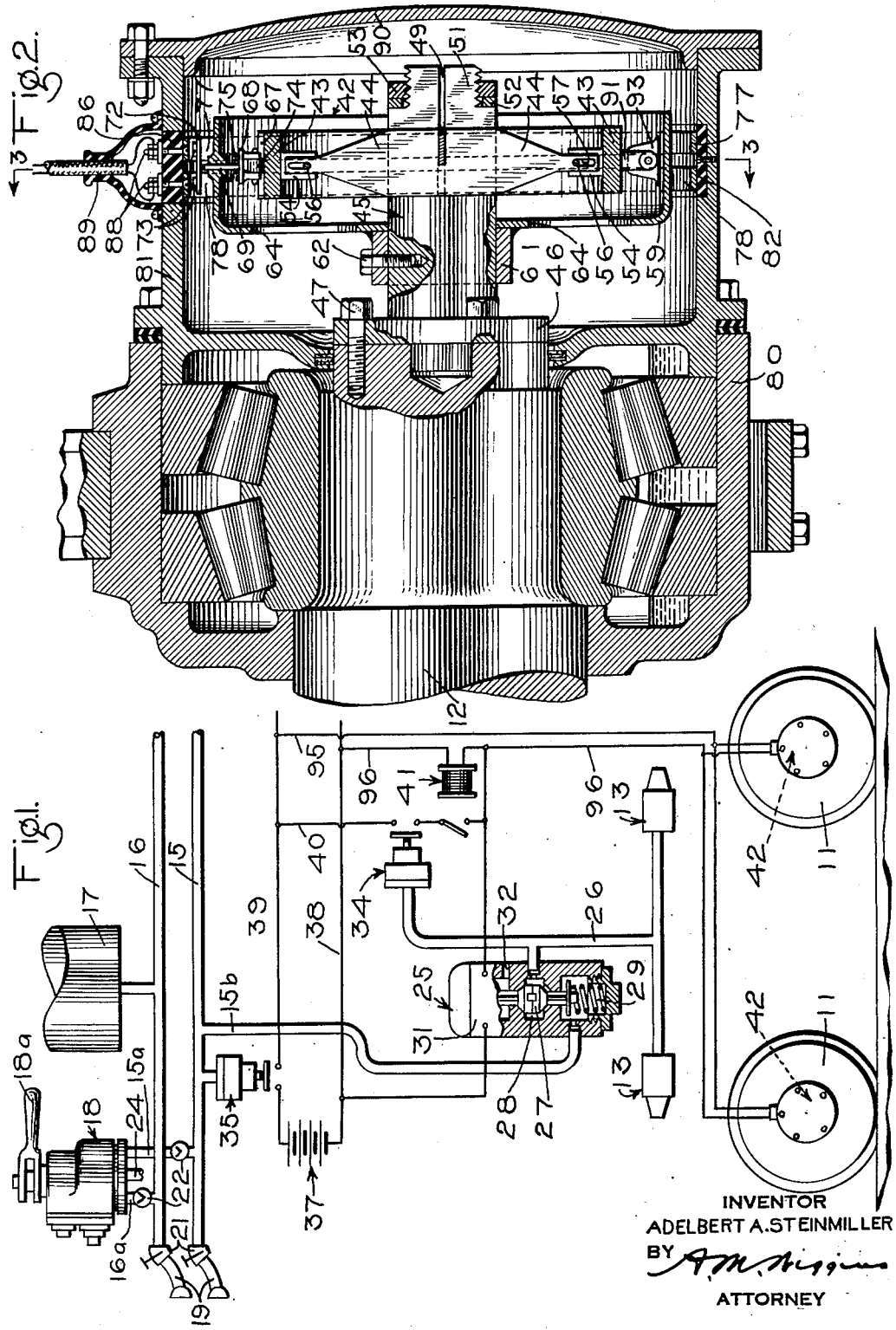
INVENTOR
ADELBERT A. STEINMILLER
BY
ATTORNEY

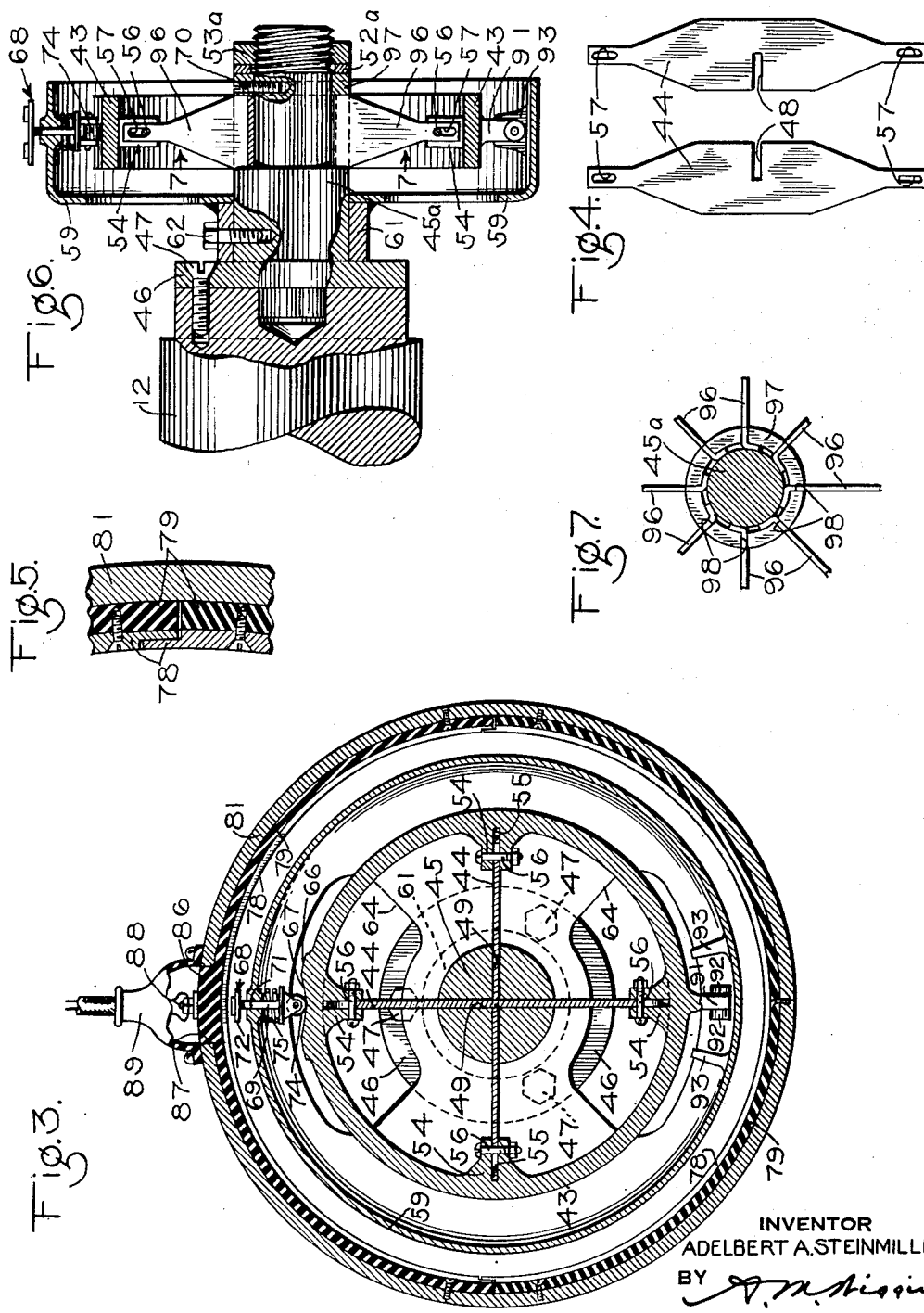

Patented July 21, 1942

2,290,589

UNITED STATES PATENT OFFICE 2,290,589

ROTARY INERTIA DEVICE

Adelbert A. Steinmiller, Pittsburgh, Pa., assignor to The Westinghouse Air Brake Company, Wilmerding, Pa., a corporation of Pennsylvania Application January 31, 1941, Serial No. 376,728

20 Claims. (Cl. 200—52)

This invention relates to rotary inertia devices adapted to register or detect the rate of change of speed of a rotary element and which are applicable for any desired purpose such as the control of brakes associated with the rotary element.

Rotary inertia devices heretofore known have been provided in association with the wheels of railway cars for the purpose of detecting a slipping condition of the wheel and to then be effective to cause an instantaneous release of the brakes to prevent the slipping wheels from decelerating to a locked condition and sliding. The terms "slipping" and "sliding" as employed herein are not synonymous. A "slipping" condition refers to the rotation of a vehicle or car wheel at a speed less than a speed corresponding to car speed at a given instant, whereas a "sliding" condition refers to the dragging of a vehicle wheel along a rail or road surface in a locked-or non-rotative condition.

Various ways of arranging a rotary inertia device so as to be driven in accordance with the rotational speed of a vehicle wheel have been proposed, one of which is illustrated in Patent 2,198,033 to Clyde C. Farmer. The rotary inertia device of this patent comprises a fly-wheel of relatively heavy mass rotatably mounted by ball or roller bearings on a spindle attached to or coupled in coaxial relation with the end of a wheel axle, the fly-wheel being connected to and driven from the spindle through a resilient connection, such as a coil or leaf spring. Suitable switch mechanism responsive to the relative rotary movement of the fly-wheel with respect to the spindle is provided for effecting the desired control of the brakes.

Rotary inertia devices of this type are relatively costly. In addition, due to the heavy mass of the fly-wheel and the limited rotary movement of the fly-wheel with respect to the spindle on which it is mounted, fretting of the parts of the bearing between the fly-wheel and spindle occurs which, in turn, results in undesirable high friction and erratic response of the fly-wheel to a given rate of deceleration or acceleration of the car wheels. It will be understood that the constant shock on and vibration of the fly-wheel as a result of operation of the car on a track produces the above-mentioned fretting of the bearing parts.

It is accordingly an object of my invention to provide a rotary inertia device which is simpler and costs less to make than rotary inertia devices heretofore known or proposed, and which at the same time avoids the possibility of bearing difficulties due to fretting.

The above object, and other objects of my invention which will be made apparent hereinafter, are attained by several illustrative embodiments thereof subsequently to be described and shown in the accompanying drawings wherein Fig. 1 is a fragmental diagrammatic view, showing a simplified fluid pressure brake control system for the wheels of a single railway car truck and employing the rotary inertia device of my invention, Fig. 2 is an enlarged vertical sectional view showing one embodiment of my invention, Fig. 3 is a sectional view, taken on the line 3—3 of Fig. 2, showing further details of construction, Fig. 4 is a view showing the construction of the leaf springs employed in the embodiment shown in Figs. 2 and 3, Fig. 5 is a fragmental enlarged view, showing with greater clarity certain details of construction, Fig. 6 is a fragmental vertical sectional view, showing a modified embodiment of my invention, and Fig. 7 is a fragmental sectional view, taken on the line 7—7 of Fig. 6.

Description

While the rotary inertia device constituting my invention is not limited in its use to a vehicle brake control system, it is shown and described in connection with a vehicle brake control system for the purpose of illustrating the manner of its use.

For the purposes of the present invention, it is deemed sufficient to illustrate the control of the brakes associated with a single four-wheel truck of a railway car, only two wheels 11 being visible in Fig. 1. It should be understood, however, that the wheels 11 shown in Fig. 1 are fixed on corresponding axles 12 (Fig. 2) on the opposite end of which a second wheel, not shown, is fixed. The two wheels connected by a common axle are referred to herein as a wheel unit but it will be understood that the term "wheel unit" may also designate a single wheel in cases where the wheels of a wheel truck are separately rotatable.

The fluid pressure brake control apparatus shown in Fig. 1 comprises essentially a pair of brake cylinders 13, each of which is arranged in conventional manner through suitable brake levers and brake rigging to effect the operation of brake shoes (not shown) associated with a braking surface, such as the rim, of the wheels of a corresponding wheel unit. Fluid under pressure may be supplied to the brake cylinders 13 to effect application of the brakes and released from the brake cylinders to effect release of the brakes by any suitable apparatus under the control of the operator of the vehicle. For purposes of illustration, a simple straight-air brake control apparatus is shown comprising a straight-air pipe 15, a supply pipe 16 to which a source of fluid under pressure such as a reservoir 17 is constantly connected, and a manually operative brake valve 18 of well known self-lapping type.

The straight-air pipe 15 and the supply pipe 16 are train pipes which extend from end to end of each car, the sections of the pipe on successive cars being connected through suitable hose couplings 19 and angle cocks 21 in a conventional manner.

The brake valve 18 is connected to the pipe 15 by a branch pipe 15a containing a manually operable valve 22. In a similar manner the brake valve is connected to the pipe 16 by a branch pipe 16a containing a similar manually operative valve 22. The valves 22 are normally in open position when it is desired to have the brake valve 18 control the pressure in the straight-air pipe 15. When it is desired to cut the brake valve 18 out of operation, as when it is desired to control the pressure in the straight air pipe 15 by means of a brake valve located on another car, the valves 22 are closed.

The construction and operation of the self-lapping brake valve 18 is so well known that a mere functional description thereof is deemed sufficient for purposes of the present invention. The operating handle 18a of the brake valve is normally in a brake release position in which the pressure in the straight-air pipe 15 is vented to atmosphere through an exhaust port and pipe 24 at the brake valve. When the brake valve handle 18a is shifted in a horizontal plane out of its brake release position into its application zone, fluid under pressure is supplied by the brake valve from the supply pipe 16 to the straight-air pipe 15, the pressure established in the straight-air pipe being substantially proportional to the degree of displacement of the brake valve handle out of its brake release position.

If the pressure in the pipe 15 reduces due to leakage or some other cause, the brake valve 18 automatically continues to supply fluid under pressure to the pipe 15 to maintain a pressure therein corresponding to the position of the brake valve handle.

Any desired arrangement may be provided for supplying fluid under pressure to and releasing fluid under pressure from the brake cylinders 13 in accordance with the fluid pressure established in the straight-air pipe 15. For purposes of illustration, such apparatus is illustratively shown as comprising a branch pipe 15b in which is interposed a magnet valve 25, the pipe 15b opening into a pipe 26 having two branches leading respectively to the two brake cylinders 13.

The magnet valve 25 normally establishes communication through the branch pipe 15b to permit the supply of fluid under pressure to the brake cylinders and the release of fluid under pressure from the brake cylinders in accordance with the supply and release of fluid under pressure to and from the straight-air pipe 15.

The magnet valve 25 is operated to cut off the connection between the straight-air pipe 15 and the brake cylinders 13 and independently release fluid under pressure from the brake cylinders under the control of the rotary inertia devices 42, comprising my invention, associated with the wheels 11 of the car in a manner hereinafter to be described.

The magnet valve 25 is a standard type valve having a double beat valve 27 contained in a chamber 28 and normally shifted to an upper seated position by a coil spring 29. Upon energization of the electromagnet winding 31, the valve 27 is shifted to a lower seated position.

In its upper seated position, the valve 27 establishes communication through the branch pipe 15b, thereby enabling the supply of fluid under pressure from the straight-air pipe 15 to the brake cylinders 13 and the release therefrom by reduction of the pressure of the straight-air pipe. In its lower seated position, valve 27 closes the communication through the branch pipe 15b and causes fluid under pressure to be exhausted from the brake cylinders 13 to atmosphere through an exhaust port 32 at a rapid rate.

Additional apparatus comprises two fluid pressure operated switch devices 34 and 35, the switch 34 being connected to the pipe 26 and controlled according to the pressure in the brake cylinders and the switch 35 being connected to the straight-air pipe 15 and responsive to the pressure therein.

The pressure operated switches 34 and 35 may be of any suitable snap-acting type responsive to variations of the controlling fluid pressure from above to below (or vice versa) a certain critical pressure. The pressure switch 34 is designed to open its contacts when the controlling fluid pressure reduces below ten pounds per square inch and, conversely, to close its contacts when the controlling fluid pressure increases above such pressure. The pressure switch 35 is designed to close its switch contacts when the pressure in the straight-air pipe increases above five pounds per square inch, and conversely, to open its contacts when the pressure reduces below such value.

Also provided on each car is a storage battery 37 to the negative terminal of which is connected a negative bus wire 38 and to the positive terminal of which is connected, under the control of the pressure switch 35, a positive bus wire 39.

A relay 41 is also provided for a purpose hereinafter to be described.

Referring now to Fig. 2, the rotary inertia device 42 shown therein comprises a ring or inertia member 43, wholly supported by means of a plurality of leaf spring members in coaxial relation to a spindle or shaft 45 having a flange 46 attached by suitable screws 47 to the end of the axle 12 in a manner such that the spindle rotates in coaxial relation to the axle.

As shown in Figs. 3 and 4, the leaf spring members 44 are provided with transverse slots 48 extending half way therethrough, and assembled at right angles to each other in familiar manner.

The spindle 45 is provided with two longitudinally extending slots cut or formed at right angles to each other from the outer end opposite the flange 46, which outer end is provided with a portion 51 of reduced diameter having threads thereon. The width of the slots 49 is only slightly greater than the thickness of the spring members 44 so as to snugly receive them therein. After the intersecting spring members 44 are received in the slots 49, a lock washer 52 and a nut 53 are assembled on the threaded portion 51 of the spindle, which portion may be slightly tapered to provide a positive clamping of the spring members 44 upon tightening of the nut 53.

The spring members 44 may have any desired contour but are preferably tapered to a narrower width at the outer extremity thereof radially than at the base adjacent the spindle.

Formed on or attached to the inner periphery of the ring or inertia member 43 are a plurality of lugs 54, each provided with a slot 55 extending in a radial direction for receiving the outer end of a corresponding one of the spring members 44 in snug-fitting relation without unduly restricting the sliding of the spring member in the slot. If desired, slots 55 may be lined with a suitable anti-friction metal. A suitable pin or bolt 56 extends transversely through each lug 54 and an elongated opening 57 in the outer end of the spring member 44 confined in the lug for holding the ring or inertia member 43 on the spring members.

The inertia or ring member 43 is accordingly wholly supported by the spring members 44 in coaxial relation to the spindle 45 and the ring thus rotates with the spindle. As long as the spindle 45 rotates at a constant speed, the ring member 43 remains in a certain rotational position with respect to the spindle. When the spindle changes speed, that is either decelerates or accelerates, the ring member 43 shifts rotatively with respect to the spindle out of the certain position.

The elongated openings 57 in the ends of the spring members 44 permit the ring member 43 to move with respect to the spring members when the ring member tends to over-run or under-run the spindle 45. It will be seen that in order to permit rotational movement of the ring member 43 with respect to the spindle 45, the distance between the base of the spring members at the periphery of the spindle 45 and the point of attachment of each arm of the spring members to the corresponding lug 54 must increase.

The rotary inertia device 43 further comprises a cup-shaped member 59 of relatively rigid sheet metal having a central opening corresponding in diameter to that of the spindle 45 and secured, as by welding, to a sleeve 61, constituting a hub therefor, which sleeve has an inner diameter corresponding to that of the outer diameter of the spindle 45.

The cup-shaped member 59 is assembled endwise over the outer end of the spindle 45 into a position in which the hub 61 engages the flange 46 before the spring members 44 are assembled in the spindle. A suitable screw 62 extending through the hub 61 of the cup-shaped member secures it rigidly to the spindle 45 with the open end of the cup-shaped member outwardly so as to enable the ring member 43 and spring members 44 to be received therewithin in concentric relation. The radial web of the cup-shaped member 59 is provided with suitable openings 64 for the purpose of decreasing the weight thereof and also providing access to the screw 62.

The ring member 43 is provided at one point on the outer surface thereof with two cams formed by a raised portion or boss 66 having a shallow V-shaped recess 67 therein. Carried by the cylindrical portion of the cup-shaped member 59 at a point opposite the V-shaped recess 67 is a switch or contact device 68. The switch device 68 comprises a stem 69 guided in an opening 71 extending radially through the wall of the horizontal cylindrical portion of the cup-shaped member 59 and having attached thereto, in insulated relation, a metallic flexible resilient member 72 outside the cup-shaped member and carrying suitable contact disks 73 in spaced relation. The inner end of the stem 69 is provided with a suitable yoke or clevis for receiving a roller 74, and a spring 75 interposed between the inner surface of the cup-shaped member 59 and the yoke at the end of the stem 69 biases the stem radially inwardly so as to effect the engagement of the roller 74 with the V-shaped recess 67 at the deepest portion thereof.

Associated with the switch device 68 are a pair of collector rings 77 and 78 attached to an insulating ring 79 in turn secured within a cylindrical or tubular casing 81, adapted to be secured to the outer end of the axle journal 80 in place of the usual end cover. Casing 81 is closed at its outer end by an end cover 90 removably attached thereto as by a plurality of screws or bolts, as shown.

In order to permit the assembly of the insulating ring 79 in the annular groove 82 cut on the inner periphery of the casing 81 to receive it, the ring 79 is preferably split diametrically into two semi-circular portions, as shown in Figs. 3 and 5. Each of the collector rings 77 and 78 may also be divided into two semi-circular portions, the cooperating ends of which overlap as shown in Fig. 5 to provide a continuous electrical connection between the two portions of the ring.

One of the half-portions of the insulating ring member 79 is provided with a boss 86 which extends through a suitable opening 87 in the wall of the casing 81 to the exterior thereof. A pair of terminal bolts or posts 88 extending through the boss 86 from the rings 78 and 77 provide a means for connecting electrical wires to the rings. A protective sleeve or cup 89 of rubber or other similar material, may be provided as shown for covering the terminal posts 88.

Formed on the outer periphery of the ring or inertia member 43 is a radially projecting lug 91 having rubber disks 92 secured on opposite faces thereof and adapted to engage suitable inwardly projecting lugs 93 on opposite sides of the lugs 91 formed on or attached to the inner surface of the cylindrical portion of the cup-shaped member 59 for limiting the degree of relative rotary movement between the inertia ring member 43 and the spindle 45.

The degree of relative rotary movement between the ring member 43 and the spindle 45 permitted by the stop lugs 93 is such that the roller 67 of the switch device 68 can ride up out of the V-shaped recess to the top of the boss 66 before striking either of the lugs.

It will be apparent that whenever the rotational speed of the axle 12 changes, the ring or inertia member 43 over-runs or under-runs the spindle 45 depending upon whether the axle is decelerating or accelerating, respectively. The weight of the ring member 43 and the bending strength of the spring members 44 is such that unless the axle 12 changes its speed at a rate exceeding a certain rate, the rotary ring or inertia member 43 is not displaced rotarily with respect to the spindle 45 a sufficient amount to cause the roller 67 of the switch device to ride up out of the V-shaped recess 67. When the axle 12 decelerates or accelerates at a rate in excess of such certain rate, which may correspond to ten miles per hour per second deceleration or acceleration of the vehicle, the rotary displacement of the ring member 43 is sufficient to cause the roller 74 of the switch device to climb to the top of the boss 66 and thereby cause the two collector rings 77 and 78 to be connected through the flexible contact element 72. The element 72 is sufficiently flexible to permit a firm contact of the contact disks 73 with the respectively associated collector rings when the roller 74 of the switch device is on the outside surface of the boss 66 out of the recess 67.

In view of the fact that a railway car wheel cannot decelerate at a rate exceeding ten miles per hour per second unless it is in a slipping condition, it will be apparent that the switch device 68 is actuated to connect the collector rings 77 and 78 only when a wheel unit with which the device is associated begins to slip.

*Operation*

In order to demonstrate the utility of the rotary inertia device, comprising my invention, in the typical brake control apparatus shown in Fig. 1, a hypothetical operation of the brake equipment will now be described.

Let it be assumed that a railway car or train, on which the brakes associated with each wheel truck are controlled in a manner shown in Fig. 1 is traveling along the road under power with the brakes released and that the operator desires to bring the car to a stop. To do so, the operator shuts off the propulsion power and shifts the brake valve handle 18a into the brake application zone thereof to a position corresponding to the desired degree of application of the brakes.

The straight-air pipe 15 is thus charged to a pressure corresponding to the position of the brake valve handle, for example fifty pounds per square inch, and fluid under pressure is accordingly supplied from the straight-air pipe through branch pipe 15b to the brake cylinders 13 at a corresponding pressure to effect application of the brakes associated with the car wheels 11.

As long as the car wheels do not slip, no further variation in the degree of application of the brakes occurs, except under the control of the operator through variation of the pressure in the straight air pipe 15, and also as a result of variation of the coefficient of friction between the brake shoes and the car wheel due to reducing vehicle speed.

If either one or both of the car wheels 11 of the wheel truck shown in Fig. 1 begin to slip, the corresponding rotary inertia device 42 is operated to establish a circuit for energizing the magnet winding 31 of the magnet valve 25 and the electromagnet winding of the relay 41. This circuit extends from the positive terminal of the battery 37 by way of positive bus wire 39 including pressure switch 35 (now closed), a wire 95 connected to one of the collector rings, such as collector ring 77 of each rotary inertia device, thence through the contact 72 of the switch device 68 to the other collector ring 78 of the inertia device 42, through a wire 96, connected to the collector rings 78 of both rotary inertia devices, and thence in parallel through the electromagnet winding of the relay 41 and magnet winding 31 of magnet valve 25 to the negative bus wire 38.

Assuming a fluid pressure of fifty pounds per square inch to be established in the brake cylinders 13, pressure switch 34 is correspondingly actuated to its closed position. Accordingly, when the single contact of the relay 41 is actuated to its picked-up or closed position, it establishes a self-holding circuit for the relay 41 and a "stick" or holding circuit for the magnet winding 31 of the magnet valve 25 independently of the rotary inertia devices 42. This self-holding and "stick" circuit extends from the positive bus wire 39 (subject to pressure switch 35) through a branch wire 40 including the contacts of pressure switch 34 and relay 41 in series relation and thence in parallel through the winding of relay 41 and magnet winding of magnet valve 25 to the negative bus wire 38.

The double seat valve 27 of the magnet valve 25 is accordingly shifted to its lower seated position in response to the energization of the magnet winding 31 to cut off the further supply of fluid under pressure to the brake cylinders 13 through the branch pipe 15b and cause fluid under pressure to be vented from the brake cylinders 13 and the pressure switch 34 through the exhaust port 32 at a rapid rate.

Due to the instantaneous and rapid reduction of the pressure in the brake cylinders 13, the slipping wheels cease to decelerate toward a locked condition and begin to accelerate back toward a speed corresponding to car speed without actually decelerating to a locked condition. When the wheels change from deceleration to acceleration, the ring or inertia member 33 of the rotary inertia devices associated with the slipping wheels shifts from an over-running to a lagging position with respect to the associated spindle 45, thus momentarily permitting the roller 74 of the switch device 68 to return to the recess or notch 67 in the boss 66 and thereby effecting disengagement of the contact 72 from the collector rings 77 and 78.

Due to the "stick" or holding circuit for the magnet winding 31 of the magnet valve 25 maintained by the relay 41, it will be seen that once the contact 72 of the switch device 68 is actuated to connect the collector rings 77 and 78, further operation of the rotary inertia devices during any one slipping cycle is without controlling effect.

It will be apparent, therefore, that a mere momentary connection of the collector rings 77 and 78 is required to initiate the continued reduction of the pressure in the brake cylinders 13.

When the pressure in the brake cylinders 13 reduces below ten pounds per square inch, the pressure switch 34 is restored to its open position interrupting the holding circuit for the magnet winding of the magnet valve 25 and the self-holding circuit for the relay 41. The relay 41 accordingly is restored to its dropped-out or open position and the magnet winding 31 of the magnet valve 25 is deenergized, thereby restoring the communication through the branch pipe 15b to the brake cylinders 13.

The reduction of the pressure in the brake cylinders 13 occurring in response to the energization of the magnet winding 31 of the magnet valve 25 takes place over an interval of time sufficiently long for the slipping wheels to be restored completely to a speed corresponding to car speed and thus the resupply of fluid under pressure to the brake cylinders 13 and the consequent initiation of reapplication of the brakes on the wheels which slipped does not take place until the slipping wheels have been completely restored to a speed corresponding to car speed, thus minimizing the possibility of recurring slipping cycles which might result if reapplication were initiated while the wheels were still in a slipping condition.

The supply of fluid under pressure from the straight-air pipe 15 to the previously vented brake cylinders 13 to effect reapplication of the brakes on the wheels which slipped tends to produce a reduction of the pressure in the straight-air pipe 15. Due to the pressure-maintaining feature of the brake valve 18 however, fluid under pressure is supplied to the straight-air pipe to maintain a pressure therein corresponding to the position of the brake valve handle.

The operator of a car or train customarily reduces the degree of application of the brakes as the speed of the vehicle reduces so that, ordinarily, the reapplication of the brakes does not produce repeated slipping of the wheels. If the wheels do again begin to slip in response to the reapplication of the brakes thereon, the above automatic operation is repeated. Thus at no time are the wheels permitted to decelerate to a locked or non-rotative condition and slide. The development of flat slots on the wheels, which is objectionable because of the cost of replacement or repair of the wheels is thus obviated.

When the car or train comes to a stop, the operator may release the brakes by merely restoring the brake valve handle 18a to its brake release position in which the fluid under pressure in the brake cylinders 13 and straight-air pipe 15 is vented to atmosphere through the exhaust port 24 at the brake valve. When the pressure in the straight-air pipe 15 and brake cylinders 13 is reduced to atmospheric pressure, the brakes associated with the vehicle wheels 11 are completely released.

The reduction of the pressure in the straight-air pipe 15 to below five pounds per square inch causes the pressure switch 35 to be restored to its open position thereby insuring deenergization of the magnet windings 31 of the magnet valve 35 and of the relay 41 if, for some reason, this may not previously have occurred.

The pressure switch 35 also is effective to prevent the undesired energization of the magnet winding 31 of the magnet valve 25 and of the relay 41 if the rotary inertia devices 42 happen to be associated with traction wheels connected to propulsion motors or engines which may cause racing of the wheels on starting of the vehicle. It will be seen that if the wheels begin to race in response to the application of excessive propulsion torque, the consequent rate of acceleration thereof will cause the contact 72 of switch device 68 of the rotary inertia devices 42 to be actuated to connect the collector rings 77 and 78. Since the pressure switch 35 is opened, however, when the brakes are released as they are when starting the car or train, the circuit for energizing the magnet valve 25 and relay 41 cannot be completed. Thus unnecessary consumption of energy from the battery 37 is prevented.

*Figures 6 and 7*

Referring to Figs. 6 and 7, a second embodiment of my invention is shown wherein a different arrangement is provided for mounting the inertia or ring member 43. Only differences between the present embodiment and the first embodiment will be pointed out and it will thus be understood that corresponding parts and elements in the two embodiments are designated by the same numerals without further description.

The rotary inertia device shown in Fig. 6 comprises a spindle 45a differing somewhat in construction from the spindle 45 although it is provided with an end flange 46 whereby the spindle is secured by a plurality of screws 47 to the axle 12. The shank of the spindle 45a is divided longitudinally into two sections one of which is of larger diameter adjacent the end flange 46 and the other of reduced diameter extending to the outer end which is provided with suitable threads. The cup-shaped member 59 is attached by a screw 62 to the portion of the spindle 45a of larger diameter.

Instead of providing integral spring members 44 which form two diametrically opposite radial spring arms as in the first embodiment, a plurality of individually formed spring elements 96 are provided for supporting the inertia ring 43 on the spindle 45a.

Any desired number of spring elements 96 may be provided although, for purposes of illustration, eight have been shown.

The spring elements 96 are secured to the spindle 45a by means of a sleeve member 97 having an inner diameter greater than the outer diameter of the spindle at the reduced portion thereof along one longitudinal portion thereof and a portion corresponding closely to the outer diameter of the portion of reduced diameter of the spindle 45a. The sleeve member 97 is provided with a plurality of longitudinally extending slots 98 preferably spaced in substantially equi-distant angular relation around the peperiphery of the sleeve member for receiving the spring elements 96 endwise in snug-fitting relation. The inner end of the spring elements 96 is pre-formed or bent at right angles to the radially extending portion in order to limit the outward radial movement of the spring elements.

All of the spring elements 96 are first assembled into the slots of the sleeve member 97 in the manner shown in Fig. 7 and the entire assembly then placed endwise over the end of the spindle 45a with the open end of the slots 98 toward the shoulder formed between the larger and smaller diameters of the spindle.

The width of the spring elements 96 at the inner end thereof adjacent the spindle 45 is identical with the depth of the slot 98 so that when the sleeve 97 engages the shoulder between the larger and smaller diameters of the spindle 45a, the spring elements 96 are held firmly in position against longitudinal movement as well as radial movement, since the bent-over portion at the inner end of the spring elements is held in snug-fitting relation between the portion of the spindle 45a of reduced diameter and the inner surface of the sleeve 96.

A lock washer 52a and nut 53a are assembled over the threaded end of the spindle 45a for securely locking the sleeve to the spindle. Additional means may be provided in the form of a screw 70 extending through a tapped hole in the continuous portion at the outer end of the sleeve 97 into the spindle 45a for insuring the attachment of the sleeve 97 to the spindle 45a.

The width of the spring elements 96 tapers radially outwardly to a relatively narrow outer end portion which is provided with a suitable elongated slot 57 and which is received in the slots 65 of the lugs 54 on the inner periphery of the inertia ring member 43.

The remaining parts of the rotary inertia device shown in Fig. 6 are substantially identical in structure and operation to that of the first described embodiment and accordingly no further description of the present device is deemed necessary.

Summary

Summarizing, it will be seen that I have disclosed several embodiments of a rotary inertia device having an inertia ring member supported on a driving rotary member by a plurality of radially arranged spring members or elements adapted to permit the relative rotary movement of the ring member with respect to the driving member.

In one embodiment, two integrally formed spring members are adapted to intersect each other at right angles to provide four radially arranged spring arms for supporting the inertia ring member. In another embodiment, each radially arranged spring arm is a separately formed member, all of the spring members being attached by a common sleeve member to the rotary driving member.

A contact device operated in response to the rotational shift of the inertia ring member relative to the driving rotary member is effective to connect two collector rings, stationary with respect to the rotary member and inertia ring, when a sufficient degree of displacement of the inertia ring member out of its normal position occurs.

While I have described the rotary inertia devices constituting my invention in connection with a brake control apparatus for railway cars, it should be apparent that they may be employed in any situation where it is desired to control an electrical circuit in accordance with the rate of acceleration or deceleration of a rotary element.

Furthermore, while I have shown only two specific embodiments of my invention, various omissions, additions, or modifications may be made therein without departing from the spirit of my invention. Thus, while I have shown the rotary inertia devices as driven directly from a wheel axle, it will be obvious that any suitable driving connection may be provided whereby the rotary inertia devices are rotated at any desired ratio of speed with respect to axle speed, as for example, a ten to one ratio. It is accordingly not my invention to limit the scope of my invention except in accordance with the terms of the appended claims.

Having now described my invention, what I claim as new and desire to secure by Letters Patent, is:

1. A device for detecting the rate of change of speed of a rotary element, comprising a member rotatable according to the rotational speed of the rotary element, an inertia ring, a plurality of resilient flexible elements, and means associating said rotatable member, said ring, and said resilient elements in such manner as to cause the ring to be wholly supported on the resilient elements in coaxial relation to the said rotatable member and rotated with the rotatable member while permitting limited rotational movement of the inertia ring relative to the rotatable member upon a change in the rotational speed of the rotary element, and means actuated in response to the rotational movement of the inertia ring relative to said rotatable member.

2. A rotary inertia device comprising a rotatable member, an inertia ring, a plurality of flexible resilient elements arranged radially in spoke-like formation between the rotatable member and the inertia ring, and means for connecting said resilient elements to said rotatable member and said inertia ring in such manner as to cause the inertia ring to be supported wholly by the resilient elements in coaxial relation to the rotatable member and in a certain position relative thereto as long as the rotatable member rotates at a constant speed while permitting rotational movement of the inertia ring relative to the rotatable member upon a change in speed of the rotatable member.

3. A device for detecting the rate of change of speed of a rotary element, comprising a member rotatable according to the rotational speed of the rotary element, an inertia ring, and a plurality of radially disposed resilient elements attached to said rotatable member, and means for securing said inertia ring to the said resilient elements so as to cause said ring to be wholly supported by said resilient elements in coaxial relation to said rotatable member while permitting limited rotational movement of the inertia ring relative to the rotatable member upon a change in rotational speed of the rotary element, and means actuated in response to the rotational movement of said inertia ring relative to said rotatable member.

4. A device for detecting the rate of change of speed of a rotary element, comprising a member rotatable according to the rotational speed of the rotary element, an inertia ring having a plurality of circumferentially spaced openings therein, and a plurality of radially disposed resilient elements attached to said rotatable member and arranged in such manner that the resilient elements are slidably received in corresponding openings of said ring to cause said ring to be wholly supported by said resilient elements in coaxial relation to said rotatable member and at the same time permit rotational movement of the ring relative to the rotatable member upon a change in the rotational speed of the rotary element, and means actuated in response to the rotational movement of the ring relative to said rotatable member.

5. A device for detecting the rate of change of speed of a rotary element, comprising a member rotatable according to the rotational speed of the rotary element, an inertia ring, a plurality of radially disposed resilient elements attached to said rotatable member and wholly supporting said inertia ring in coaxial relation to said rotatable member, means associatively connecting said inertia ring to said resilient elements in such a manner as to permit rotational movement of the inertia ring relative to the rotatable member upon a change in rotational speed of the rotary element, and means actuated in response to the rotational movement of the inertia ring relative to said rotatable member.

6. A device for detecting the rate of change of speed of a rotary element, comprising a member rotatable according to the rotational speed of the rotary element, an inertia ring having a plurality of circumferentially spaced openings therein, a plurality of radially disposed leaf spring elements attached to said rotatable member, the outer extremity of each of said spring elements extending into and slidably engaged in a corresponding one of said openings in said inertia ring whereby said inertia ring is wholly supported by said spring elements in coaxial relation to said rotatable member in a manner to permit the rotational movement of the inertia ring relative to the rotatable member upon a change in the rotational speed of the rotary element, and means actuated in response to the rotational movement of the inertia ring relative to the rotatable member.

7. A rotary inertia device comprising a rotatable member, an inertia ring disposed in coaxial relation to the rotatable member, and a plurality of flexible resilient elements attached substantially midway between the opposite ends thereof to the rotatable member so that the opposite ends of each of the resilient elements extend radially outwardly with respect to the rotatable member at different peripheral points thereon, and means associating said inertia ring and said resilient elements so that the resilient elements constitute a driving connection between said ring and said rotatable member.

8. A rotary inertia device comprising a rotatable shaft having a plurality of slots therein extending in a longitudinal direction from one end thereof, an inertia ring disposed in coaxial relation to said rotatable shaft, and a plurality of resilient elements each of which is received in a corresponding slot of the shaft at a point substantially midway between the opposite ends thereof so that the opposite ends extend radially outward from peripherally spaced points on the shaft, said resilient elements associating said ring and said rotatable member so as to provide a resilient driving connection between said ring and said shaft.

9. A rotary inertia device comprising a rotatable shaft having a pair of longitudinally extending intersecting slots therein, an inertia ring disposed in coaxial relation to the rotatable shaft, and a pair of leaf spring elements adapted to intersect each other at an angle corresponding to the angle of intersection of the said slots, said spring elements being received in the slots of the shaft and extending radially outward into associative relation with the inertia ring to provide a resilient driving connection between said ring and said shaft.

10. A rotary inertia device comprising a rotatable member, an inertia ring disposed in coaxial relation to said rotatable member, and a spring element attached substantially midway between the opposite ends thereof to the rotatable member in a manner that the opposite ends of the spring element extend in diametrically opposite directions radially with respect to said rotatable member, the opposite ends of said spring element cooperating with said inertia ring to provide a resilient driving connection between the inertia ring and the rotatable member.

11. A device for detecting the rate of change of speed of a rotary element, comprising a shaft rotatable according to the rotational speed of the rotary element, said shaft having a pair of open-ended slots, a pair of leaf spring elements respectively received in the slots of said shaft and secured therein in a manner to provide two radially extending spring arms for each of said spring elements, an inertia ring wholly supported on the spring arms in coaxial relation to said shaft and in a manner to permit limited rotational movement thereof with respect to said shaft upon a change in the rotational speed of the rotary element, and means actuated in response to the rotative movement of the inertia ring relative to the shaft.

12. A device for detecting the rate of change of speed of a rotary element, comprising a shaft rotatable according to the rotational speed of the rotary element, said shaft having a pair of intersecting slots extending longitudinally of the shaft from one end thereof, a pair of leaf spring elements each of which is transversely slotted to permit said spring elements to be assembled in intersecting relation at an angle conforming to the angular relation of the slots in said shaft, said spring elements being received and secured in the slots of said shaft, an inertia ring having a loose connection with the spring elements so that while wholly supported by said spring elements in coaxial relation to said shaft it is at the same time capable of limited rotational movement relative to said shaft, and means actuated in response to the rotational movement of the inertia ring relative to said shaft.

13. A rotary inertia device comprising a rotatable member, a plurality of leaf spring elements attached to said member and disposed radially in spoke-like formation in a manner to permit circumferential flexing of said spring elements, an inertia ring, and means providing a loose connection between said inertia ring and said spring elements to cause said inertia ring to be wholly supported by said spring members in coaxial relation to said rotatable member and at the same time permit rotational movement of said inertia ring relative to said shaft.

14. A rotary inertia device comprising a rotatable shaft having a plurality of slots extending in a longitudinal direction from one end thereof, a plurality of spring elements each of which is received in a corresponding slot of the shaft substantially mid-way between opposite ends thereof so that the opposite ends extend radially outward from peripherally spaced points on the shaft, means for securing said spring elements in said slots, an inertia ring, and means providing a loose connection between the said inertia ring and said spring elements whereby said inertia ring is wholly supported by said spring elements in coaxial relation to said shaft and is at the same time adapted to shift rotatively relative to said shaft upon a change in the rotational speed of the shaft.

15. A device for detecting the rate of change of speed of a rotary element, comprising a shaft rotatable according to the rotational speed of the element, an inertia ring disposed in coaxial relation to said shaft, resilient means providing a driving connection between said shaft and ring and adapted to permit rotational movement of the ring relative to the shaft upon a change in the rotational speed of said shaft, a member fixed to said shaft for rotation therewith and having a portion disposed radially outwardly with respect to said inertia ring, a member stationary with respect to said shaft, a plurality of collector rings carried by said stationary member in coaxial surrounding relation to said member fixed to the shaft, and a contact device carried by the portion of said member fixed to the shaft and adapted to be actuated into bridging contact with said collector rings upon a predetermined rotational movement of the inertia ring relative to said shaft.

16. A device for detecting the rate of change of rotational speed of a vehicle wheel, comprising a shaft rotatable according to the rotational speed of the vehicle wheel, an inertia ring disposed in coaxial relation to said shaft, resilient means providing a driving connection between said shaft and ring adapted to permit the rotational movement of the ring relative to said shaft upon a change in the rotational speed of the shaft, a supporting member fixed to the said shaft for rotation therewith and having a portion disposed radially outwardly with respect to said inertia ring, a member carried on the vehicle in stationary relation with respect to said shaft, a plurality of collector rings supported by said stationary member in coaxial surrounding relation to the said portion of said supporting member, and a contact device carried by the said portion of said supporting member and adapted to be shifted radially outward into contact relation with said collector rings upon a predetermined displacement of the inertia ring with respect to said shaft.

17. A device for detecting the rate of change of speed of a rotary element, comprising a shaft rotatable according to the rotational speed of the rotary element, an inertia ring disposed in coaxial relation to said shaft, resilient means providing a driving connection between said shaft and ring adapted to maintain said ring in a certain rotational position with respect to said shaft as long as said shaft rotates at a constant speed and to permit the rotational movement of said inertia ring with respect to said shaft in varying degree out of said certain position proportionally to the rate of change of speed of said shaft, a supporting member fixed to said shaft for rotation therewith and having a portion disposed radially outwardly with respect to said inertia ring, a member stationary with respect to said shaft, a plurality of collector rings carried by said stationary member in coaxial surrounding relation to the said portion of said supporting member, a contact device carried by said supporting member, and cam means on said inertia ring cooperating with said contact device for shifting it radially outwardly into contact with said collector rings upon a predetermined rotary displacement of the inertia ring relative to said shaft.

18. A device for detecting the rate of change of speed of a rotary element, comprising a shaft, rotatable according to the rotational speed of the rotary element, an inertia ring disposed in coaxial relation to said shaft, resilient means providing a driving connection between said shaft and ring adapted to maintain said ring in a predetermined rotational position with respect to said shaft as long as said shaft rotates at a constant speed and to permit the rotational movement of said ring relative to said shaft in varying degree out of said certain position in proportion to the rate of change of speed of said shaft, a tubular member disposed in coaxial surrounding relation to said inertia ring and fixed to said shaft for rotation therewith, a member stationary with respect to said shaft, a plurality of collector rings carried by said stationary member in coaxial surrounding relation to said tubular member, means carried partly by said inertia ring and partly by said tubular member for limiting the degree of rotational displacement of the inertia ring with respect to said shaft out of said certain position, a contact device carried by said tubular member, means biasing said contact device to a certain normal position out of contact with said collector rings, and cam means on said inertia ring cooperating with said contact device for shifting said contact device into engagement with said collector rings upon a predetermined displacement of the inertia ring relative to said shaft within the limited amount of relative movement permitted between said inertia ring and shaft.

19. A device for detecting the rate of change of speed of a rotary element, comprising a shaft rotatable according to the rotational speed of the rotary element, an inertia ring, a plurality of leaf spring members, a sleeve member having a plurality of longitudinally extending slots therein each for receiving a corresponding one of said leaf spring members, said sleeve member being assembled lengthwise over the one end of said shaft and secured to said shaft for rotation therewith, one end of each of said spring members being constructed so as to be held in clamped relation between said shaft and the surrounding sleeve, said spring members being radially arranged in spoke-like formation in a manner permitting circumferential bending of said spring members, and means providing a loose connection between said inertia ring and the outer extremities of said spring members to cause said inertia ring to be wholly supported by said spring members in coaxial relation to said shaft while at the same time permitting rotational movement of the inertia ring relative to said shaft out of a certain position in which it is maintained as long as the shaft rotates at a constant speed, and means actuated in response to the rotational displacement of said inertia ring out of its certain position with respect to said shaft.

20. A rotary inertia device comprising a rotatable shaft having one longitudinal portion of one diameter and another longitudinal portion of reduced diameter providing a shoulder on said shaft between said portions, a plurality of leaf spring members, a sleeve having a plurality of peripherally spaced slots therein extending longitudinally from one end in each of which slots a corresponding spring member is received, said sleeve being assembled endwise over the reduced end portion of said shaft into engagement with the shoulder on the shaft and secured to said shaft for rotation therewith, the inner ends of said spring members being so constructed as to be firmly held between said sleeve and shaft and said spring members extending radially outward in spoke-like formation in a manner to permit the circumferential bending of the spring members, an inertia ring of such diameter as to surround the extremities of said spring members, and means providing a loose connection between said inertia ring and spring members to cause said inertia ring to be wholly supported by said spring members in coaxial relation to said shaft while at the same time permitting the rotational movement of the inertia ring relative to said shaft.

ADELBERT A. STEINMILLER.